United States Patent
Ramakrishnan et al.

(10) Patent No.: US 8,738,035 B1
(45) Date of Patent: May 27, 2014

(54) SYSTEM AND METHOD FOR HYBRID POSITIONING USING WI-FI AND GNSS BLENDING

(71) Applicants: Sthanunathan Ramakrishnan, Bangalore (IN); Deric Wayne Waters, Dallas, TX (US); Jaiganesh Balakrishnan, Bangalore (IN)

(72) Inventors: Sthanunathan Ramakrishnan, Bangalore (IN); Deric Wayne Waters, Dallas, TX (US); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/728,992

(22) Filed: Dec. 27, 2012

(51) Int. Cl.
*H04W 4/02* (2009.01)

(52) U.S. Cl.
USPC .................. 455/456.1; 701/409; 342/451

(58) Field of Classification Search
CPC ........ H04W 4/02; H04W 64/00; G01C 21/26; G01S 5/02; G01S 19/42
USPC ............ 455/456.1; 701/409; 342/451, 357.25
See application file for complete search history.

(56) References Cited

U.S. PATENT DOCUMENTS

2013/0013187 A1* 1/2013 Garin ............................. 701/409
2013/0285855 A1* 10/2013 Dupray et al. ................ 342/451

* cited by examiner

*Primary Examiner* — Phuoc H Doan
(74) *Attorney, Agent, or Firm* — Ronald O. Neerings; Wade James Brady; Frederick J. Telecky, Jr.

(57) ABSTRACT

System and method for hybrid positioning using blended Wi-Fi and GNSS solution is presented, which provides an overall good positioning accuracy as compared to feed forward blending solution. Feeding back Wi-Fi and GNSS blended solutions to replace position states in GNSS enables blended solution to improve using past Wi-Fi information and also enables early correction of GPS drifts in urban canyons. Smart blending prevents early degradation of blended solution due to bad Wi-Fi information. Additionally, it gives good performance in open sky and mild urban canyons where GPS performance is generally quite good. Constrained blending enables good blending even with dependent or clustered Wi-Fi positions. It also keeps feedback loop stable by limiting changes to a blended solution.

22 Claims, 5 Drawing Sheets

SYSTEM AND METHOD FOR HYBRID POSITIONING USING WI-FI AND GNSS BLENDING

BACKGROUND

The present invention relates to positioning technology, in particular, hybrid positioning with blending multiple location technologies.

Location based services are an emerging area of mobile applications that leverages the ability of new devices to calculate their current geographic position and report that to a user or to a service. Some examples of these services include identifying a location of a person or an object in the context of entertainment, work, health or personal life.

Location based services require instantaneous reliable positioning system that can work everywhere. Since no single positioning technology can meet such requirement, combining different positioning technologies to compensate for individual technology's own limitation can provide better results. Such combinations typically include Global Navigation Satellite System (GNSS) along with other non-GNSS positioning systems, such as Wi-Fi and/or cellular positioning technologies. A Hybrid Positioning Engine (HPE) utilizes multiple positioning technologies actively collaborating in order to provide highly accurate location estimation. The limitations of conventional hybrid positioning systems are discussed and a new algorithm for hybrid positioning with Wi-Fi and GPS blending is presented. Wi-Fi discussed herein includes any wireless local area network product that is based on the IEEE 802.11 standards. It should be noted that Wi-Fi is used herein as a non-limiting example of a wireless local area network product. GPS discussed herein includes any satellite positioning system operable to provide location and time information.

Global Positioning System (GPS) is a GNSS that provides autonomous geo-spatial positioning with global coverage using satellites. GNSS allows small electronic receivers to determine their location to within a few meters using time signals transmitted along a Line-Of-Sight (LOS) by radio from satellites. GPS provides highly accurate location results in "open sky" environments, like rural areas and on highways. GPS performs poorly in urban areas where buildings block the view of satellites, and it doesn't provide any coverage inside of buildings.

In indoor environments or in the dense urban canyons, where the low level satellite based signals are critically compromised by obscuration and environmental degradation, Wi-Fi based positioning systems provide better results. Wi-Fi positioning is rapidly gaining acceptance as a complement and supplement to GNSS positioning for outdoor and indoor environments. Wi-Fi hotspots are prevalent in the very areas where GNSS starts to struggle and many smart devices are already equipped with Wi-Fi technology that can support positioning applications.

Performance of GNSS receivers is often poor in deep urban canyons for a number of factors such as low number of visible satellites and heavy multipath caused by multiple high-rises. Wi-Fi positioning works well where GPS performs poorly by utilizing large installed user base of Wi-Fi Access Points (AP). Additionally, low range of Wi-Fi enables reasonable positioning accuracy. An AP or a hotspot has a range of about 20 meters indoors and a greater range outdoors. Hotspot coverage can comprise an area as small as a single room with walls that block radio signals or as large as many square miles, covered by multiple overlapping APs.

The end user needs to know their location awareness anywhere and everywhere, however, no one location technology provides adequate performance in all locations. Blending different technologies for positioning, for example, Wi-Fi and GPS, provides a solution for overall good positioning accuracy. However, for efficient blending certain key points need to be considered. Since GPS performance can degrade quite sharply in deep urban canyons, it's desirable to recognize this early and prevent large GPS drifts. If blending only kicks in when GPS has drifted too much, it will not help correct the UPS back to the right path. Also, blending should be performed to help GPS when GPS needs it, otherwise it may hurt GPS performance. In a situation, when GPS positioning is already good, blending with poor Wi-Fi positioning may result in overall poor hybrid positioning as compared to GPS only positioning. Lastly, Wi-Fi positioning accuracy needs to be assessed before blending with GPS. If Wi-Fi positioning itself is not good then blending it with GPS will not provide good results. Typically, GPS and Wi-Fi fixes are blended in a feed-forward fashion using a weighted sum of their fixes, which is further explained with the help of FIG. 1.

Figure 1:
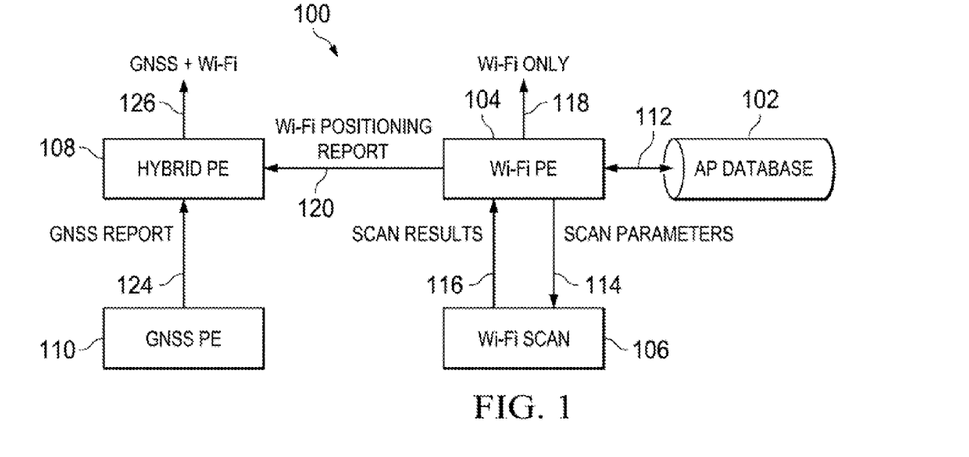
FIG. 1 illustrates a conventional positioning system using feed forward blending.

FIG. 1 illustrates a conventional positioning system 100 using feed forward blending.

As illustrated in the figure, conventional positioning system 100 includes an AP database 102, a Wi-Fi Position Engine (PE) 104, a Wi-Fi scan module 106, a hybrid PE 108 and a GNSS PE 110. For illustrative purposes, AP database 102, Wi-Fi PE 104, Wi-Fi scan module 106, hybrid PE 108 and GNSS PE 110 are shown as distinct elements, however, in some cases, at least two of AP database 102, Wi-Fi PE 104, Wi-Fi scan module 106, hybrid PE 108 and GNSS PE 110 may be combined as a unitary element.

AP database 102 contains the location of APs and is managed by a database vendor such as Google or Navizon. Generally, a database vendor collects the location of APs by "wardriving" efforts and/or crowd sourced using mobile phones such as the iPhone and the Android phone. Wardrivers use a Wi-Fi equipped device together with a GPS device to record the location of wireless networks. When a street driver finds a good GPS location, he determines that at that GPS location, there are certain number of APs and reports those APS with their respective signal strength to the database vendor. Database vendors collect this information from multiple users at different times to build up their database. AP database 102 is operable to bi-directionally communicate with Wi-Fi PE 104 via a signal 112.

Wi-Fi scan module 106 is operable to receive the scan parameters from Wi-Fi PE 104 via a signal 114 for scanning the APs and to provide the scan results back to Wi-Fi PE 104 via a signal 116. Wi-Fi scan module 106 performs the scan by sending probe requests to all the APs in the vicinity. Typically, an AP will respond with a probe response, which includes the Basic Service Set Identifier (BSSID) and Receive Signal Strength (RSS) of each AP. BSSID refers to Media Access Control (MAC) address for an AP, which uniquely identifies that AP. The scan results from APs include BSSIDs and RSSs for all the APs, which are forwarded to Wi-Fi PE 104 via signal 116. In one example, Wi-Fi scan module 106 communicates with a Wireless Local Area Network chipset (WLAN) and receives the list of scanned APs. In particular, the WLAN chipset executes the scan, wherein Wi-Fi scan module 106 sends a request and gets a response from the WLAN chipset.

Wi-Fi PE 104 is operable to provide Wi-Fi positioning based on the inputs from AP database 102, and Wi-Fi scan module 106. Wi-Fi PE 104 is operable to receive AP locations from AP database 102 based on the AP list provided as a result of Wi-Fi scan. Wi-Fi PE 104 is further operable to determine the user location based on the AP locations. Wi-Fi PE 104 provides a Wi-Fi only output via a signal 118 and also a Wi-Fi positioning report to hybrid PE 108 via a signal 120.

GNSS PE 110 is operable to receive the satellite measurements (not shown) and compute the location of a GNSS receiver. GNSS PE 110 provides a GNSS report to hybrid PE 108 via a signal 124. GNSS PE 110 triangulates the position based on a pseudo-range that indicates how far the user is from the satellites and the user velocity, GNSS PE 110 may include a Kalman filter, which filters this information across time. Kalman filter algorithm is an optimized method of determine the best estimation of a system's current state. The algorithm works in a two-step process. In the prediction step, the Kalman filter produces estimates of the true unknown values, along with their uncertainties. Once the outcome of the next measurement is observed, these estimates are updated using a weighted average, with more weight being given to estimates with higher certainty. The Kalman filter keeps track of the estimated state of the system and the variance or uncertainty of the estimate. The estimate is updated using a state transition model and measurements. Kalman filter receives measurements from multiple satellites and determines the effective current location based on the past as well as the new measurements from the satellites.

Hybrid PE 108 is operable to perform blending of Wi-Fi fix and GNSS fix for a user location based on the Wi-Fi positioning report received from Wi-Fi PE 104 and the GNSS report received from GNSS PE 110. Typically, for conventional positioning system 100, GPS and Wi-Fi fixes are blended in a feed-forward fashion using a weighted sum of their fixes. Generally, the weights are based on the uncertainties in the measurement. If the GPS solution is good and the Wi-Fi solution is not as good, more weightage is given to the GPS solution. Alternatively, if the Wi-Fi solution is good and the GPS solution is not as good, more weightage is given to the Wi-Fi solution.

This method has few limitations, which are discussed below. When good Wi-Fi fixes are available only for a short time, blended solution will improve only during that time and will not improve for the later fixes. Since Wi-Fi fix is good only for a short time, more weightage is given to the Wi-Fi solution. If Wi-Fi solution is not good thereafter and the GPS solution was not good throughout, then the blended solution will not improve in the latter part. Additionally, if Wi-Fi and GPS uncertainty estimates are already inaccurate, they will result in poor blending performance. It is possible to give unnecessary weightage to one solution thinking that the fix is good but that may be inaccurate. Errors in GPS or Wi-Fi fix, not reflected in the uncertainty metric will cause deviations in the blended fix.

Additionally Wi-Fi and GPS fixes are typically colored by the past and do not represent independent information, therefore, using a weighted sum is decidedly non-optimal in such cases. Wi-Fi fixes, which is computed based on the visible APs may be more clustered. Using this information multiple times in blending will cause clustering of the blended fixes as well.

What is needed is a blending method for Wi-Fi and GPS that overcomes the problems present in the feed-forward blending method and additionally provides an overall good positioning accuracy.

BRIEF SUMMARY

The present invention provides a system and method for blending Wi-Fi and GPS that overcomes the problems present in the feed-forward blending method and additionally provides an overall good positioning accuracy.

An aspect of the present invention is drawn to a device for use with wireless local area net work product and a satellite position system. The wireless local area network product provides a local area network product position signal. The satellite positioning system provides a satellite positioning system position signal. The device includes a wireless local area network receiver, a satellite positioning system receiver, a wireless local area network position processing engine, a satellite positioning system position processing system and a hybrid processing engine. The wireless local area network receiver can receive the local area network product position signal. The satellite positioning system receiver can receive the satellite positioning system position signal. The wireless local area network position processing engine can generate a first position signal based on the local area network product position signal. The satellite positioning system position processing engine can generate a second position signal based on the satellite positioning system position signal. The hybrid processing engine can determine whether to generate a third position signal based on the second position signal or to generate the third position signal based on the first position signal and the second position signal, can generate a third position signal based on the second position signal and can generate the third position signal based on the first position signal and the second position signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Aspects of the invention provide an algorithm for blending Wi-Fi fix and GNSS fix to provide an overall good positioning accuracy. Main elements of Wi-Fi and GNSS blending solutions are discussed with different embodiments of the invention.

In one embodiment of the invention, the blended positions are fed back to the GNSS Kalman filter and the position states in the Kalman filter are replaced with the blended positions.

In one embodiment of the invention, smart blending is performed by blending Wi-Fi fix and GNSS fix only when GNSS needs help.

In one embodiment of the invention, constraint blending is performed by modifying strength of blending based on Wi-Fi and GNSS fixes.

Wi-Fi positioning may be server-based or STA-based, wherein an STA is a station that is operable to use the Wi-Fi protocols. In server-based positioning, each STA sends the list of BSSIDs and RSSs to a server, such as Google or Navizon, which responds with a user location. Since there may be large latency in accessing the server (2-5 or even 10 seconds), this is not the optimal method for blending with GNSS. For STA-based positioning, the database of AP locations is available at the STA from a database vendor like Navizon. STA looks up the AP locations from the database and estimates user location. This method provides very low latency (<1 second) and is preferred method for blending.

Figure 2:
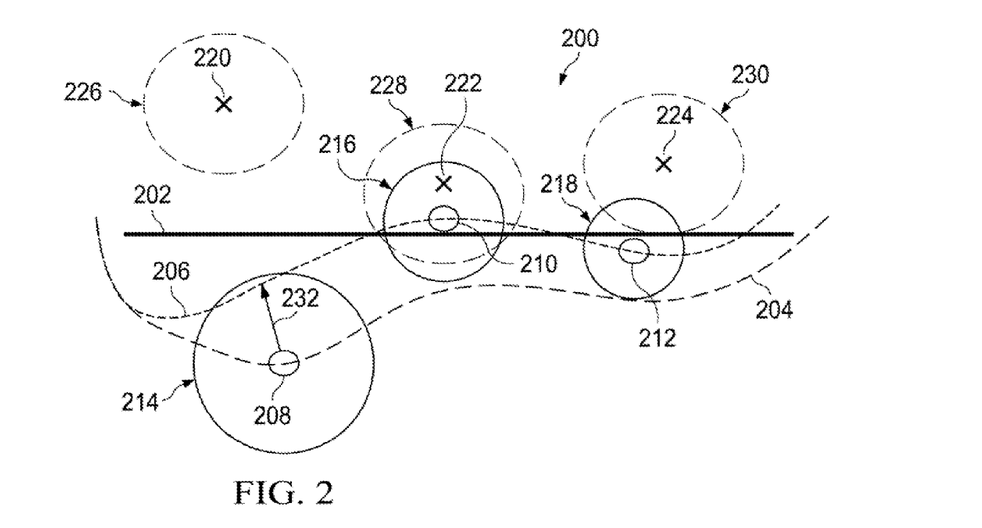
FIG. 2 illustrates different scenarios of the GPS and Wi-Fi blended solution, in accordance with an aspect of the invention.

An example embodiment of GPS and Wi-Fi blended solution illustrating different scenarios is discussed with the help of FIG. 2.

FIG. 2 illustrates different scenarios of the GPS and Wi-Fi blended solution, in accordance with an aspect of the invention.

As illustrated in the figure, a user is following a true path 202. A GPS only trajectory 204 represents a GNSS solution without blending. A GPS and a Wi-Fi blended trajectory 206 represents a blended solution based on the feedback of blending information that follows a different trajectory than UPS only trajectory 204.

Dots 208, 210 and 212 represent GNSS output just before blending. A circle 214 represents the uncertainty circle of GNSS output 208. A circle 216 represents the uncertainty circle of GNSS output 210. A circle 218 represents the uncertainty circle of GNSS output 212.

An uncertainty circle represents the potential location of the user as indicated by a particular technology (Wi-Fi/GPS etc.). The uncertainty circle means that with very high probability, the user is within the region covered by the circle. The center of the uncertainty circle represents the reported position and the radius of the circle represents the distance from the reported position within which the user is most likely to be present.

Crosses 220, 222 and 224 denote Wi-Fi position fixes. A circle 226 represents an uncertainty circle for Wi-Fi fix 220. A circle 228 represents an uncertainty circle for Wi-Fi fix 222. A circle 230 represents an uncertainty circle for Wi-Fi fix 224.

An uncertainty circle for a Wi-Fi fix is a circle having a center position, the Wi-Fi fix, established by a Wi-Fi position system.

As illustrated in the figure, a user is following true path 202 starting from the left towards the right. At a first point in time, GNSS output 208 and Wi-Fi position fix 220 are far apart. In accordance with an aspect of the invention, GNSS output 208 is moved towards Wi-Fi position fix 220 such that GNSS output 208 stays within its uncertainty 214. Note that a blended solution 232 represents the GPS and Wi-Fi blended trajectory 206 that is based on Wi-Fi position fix 220 and the position feedback to GNSS PE 206.

At a different point in time. GNSS output 210 is within Wi-Fi uncertainty circle 228 therefore there is no need for blending. In this example, GNSS output 210 is not solely a GNSS solution. In accordance with aspects of the present invention, GNSS output 210 based on a current GNSS solution in addition to a past GPS and Wi-Fi blended solution. This will be discussed in more detail below. GPS and Wi-Fi blended trajectory 206 follows GNSS output 210.

At another point in time, GNSS output 212 is good by itself (GNSS uncertainty 218 is small) so there is no need for blending (as part of smart blending). Here, Wi-Fi position fix 224 is poor therefore it is not desirable to affect the blended solution by blending GNSS output 212 with Wi-Fi position fix 224. Hence, GPS and Wi-Fi blended trajectory 206 follows GNSS output 212.

As discussed with reference to FIG. 2, GPS and Wi-Fi blended trajectory 206 follows user's true path 202 closely, as compared to GPS only trajectory 204. As part of smart blending, if UPS solution is within Wi-Fi uncertainty or good by itself, no blending is performed. Furthermore, as part of constrained blending, GPS solution is moved based on Wi-Fi fix and the position feedback such that the blended solution stays within the GNSS uncertainty. These aspects will now be further described with reference to FIGS. 3-7.

Figure 3:
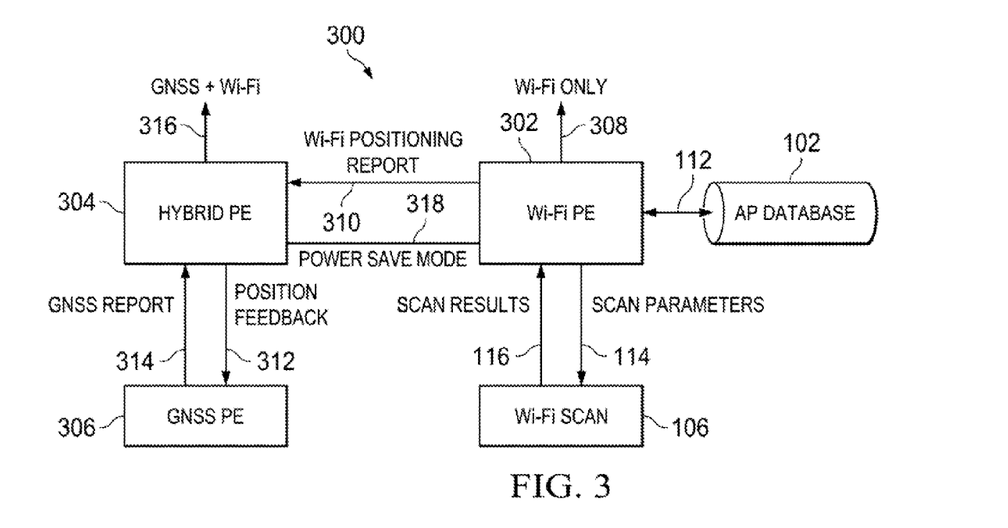
FIG. 3 illustrates a hybrid positioning system, in accordance with an aspect of the invention.

Feedback of blended positions, in accordance with an aspect of the invention is explained with the help of FIG. 3.

FIG. 3 illustrates a hybrid positioning system, in accordance with an aspect of the invention.

As illustrated in the figure, a hybrid positioning system 300 includes a Wi-Fi PE 302, a hybrid PE 304, and a modified GNSS PE 306, in addition to AP database 102 and Wi-Fi scan module 106 similar to conventional positioning system 100.

A functionality of hybrid PE 304 is somewhat similar to that hybrid PE 108, except that hybrid PE 304 is further operable to provide a position feedback signal 312 to modified GNSS PE 306 based on the Wi-Fi positioning report and GNSS report. In accordance with an aspect of the invention, hybrid PE 304 computes the blended solution between Wi-Fi fix and GPS fix and feeds back the blended position information to modified GNSS PE 306 via position feedback signal 312. The use of the position feedback provides a more accurate estimate of the current location, which changes the position states of modified (GNSS PE 306. Feedback of blended position information from hybrid PE 304 to modified GNSS PE 306 enables early correction of GPS drifts in urban canyons.

Hybrid PE 304 further provides a power saving mode to Wi-Fi PE 302 via a signal 318 in order to disable Wi-Fi PE 302 when Wi-Fi positions are not needed for blending (typically when GNSS is very good). Further, in some embodiments, Wi-Fi PE 302 may instruct Wi-Fi scan module 106, e.g., via signal 114, to modify its Wi-Fi scanning for geodetic location determining purposes.

A functionality of modified GNSS PE 306 is somewhat similar to that GNSS PE 110, except that modified GNSS PE 306 is further operable to receive the position feedback from hybrid PE 304 in order to enable the GPS states to be corrected. The GPS position states are replaced with the fed-back blended solution. Such a feedback prevents the GPS drifts by correcting positions early and avoids avalanche effects in the GPS. An avalanche effect is the effect in GPS where errors build up and cause a large drift.

In this example embodiment, as mentioned above, modified GNSS PE 306 uses a fed-back solution that is blended with a previous GNSS report and a Wi-Fi positioning report. As such, modified GNSS PE 306 will not generate a report that is solely a GNSS report. This is why the term "modified" is used to describe modified GNSS PE 306. An example of such a modified GNSS report was discussed above with reference to GNSS output 210 of FIG. 2.

It should be noted that, in some embodiments, a GNSS PE may be used that provides a pure GNSS report. In such cases, the GNSS PE may compute two solutions—one using the fed-back blended position and the other NOT the feedback blended position.

A second aspect of the present invention proposes smart blending, which suggests performing blending only when GNSS needs help. In an example embodiment, pluralities of parameters are used to estimate fix quality in deciding whether blending is needed. In most cases, these parameters are compared with pre-determined thresholds for decision making. Some non-limiting examples of such parameters include GNSS uncertainty, number of Satellite Vehicles (SVs) used in obtaining a fix, multi-path indicator, number of Wi-Fi APs and Wi-Fi uncertainty. As an example, GNSS may not need help if UPS uncertainty is low and the number of SVs is high.

A multi-path indicator is provided by the GPS. The multi-path indicator indicates a number of paths from the satellite to the receiver that are not in the LOS. The multi-path indicator may be higher in urban canyons due to reflection from the buildings, which is an indication that the user is in multi-path dominated situation. As an example, GNSS may need help if the multi-path indicator is high or GPS uncertainty is high or the number of SVs is very low.

In certain cases, GNSS may need help if GPS speed is very high indicating a runaway condition. This condition may arise when GPS fixes move very fast due to poor geometry and low number of SVs used in the solution. If a blending solution needs help, then blending is done in such a way that the resulting position does stray too far away from the GPS position.

Another aspect of the invention proposes constrained blending, which suggests modifying the strength of blending based on Wi-Fi and UPS fixes, after it has been determined that blending is needed. The strength of blending can be decided by the weightage given to Wi-Fi and GPS for blending. For example, if the number of SVs is very low and the GNSS solution is drifting away quickly, Wi-Fi is given more weightage than the GPS for blending.

In an embodiment of the invention, a Wi-Fi positioning report provided by Wi-Fi PE 302 and a GNSS report provided by modified GNSS PE 306 includes information that is used by hybrid PE 304 in order to perform smart blending and or constrained blending.

In another example, if a GPS fix is within the Wi-Fi uncertainty circle, i.e., the GPS fix is within the Wi-Fi solution circle, no blending is performed.

If a GPS fix is outside the Wi-Fi uncertainty circle, the GPS fix is moved almost to the edge of its own uncertainty circle or that of the Wi-Hi uncertainty circle. This prevents too large a modification to the GPS solution and keeps feedback loop stable.

Hybrid PE 304 takes into consideration smart blending, constrained blending and the position feedback for computing the blended solution, in accordance with aspects of the invention. This is further explained with the help of FIG. 4.

Figure 4:
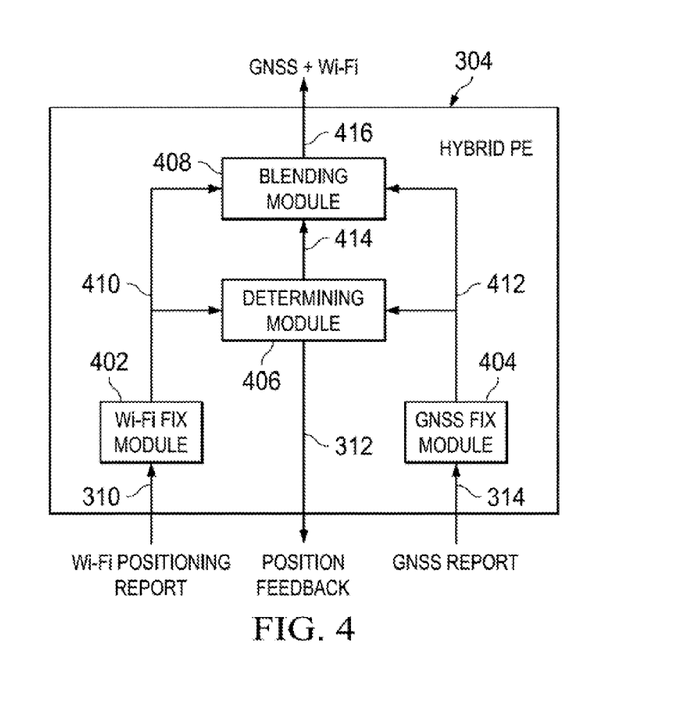
FIG. 4 illustrates an example hybrid processing engine of FIG. 3, in accordance with an aspect of the invention.

FIG. 4 illustrates hybrid PE 304, in accordance with an aspect of the invention.

As illustrated in the figure, hybrid. PE 304 includes a Wi-Fi fix module 402, a GNSS fix module 404, a determining module 406 and a blending module 408. In this example, Wi-Fi fix module 402. GNSS fix module 404, determining module 406 and blending module 408 are distinct elements. However, in some embodiments, at least two of Wi-Fi fix module 402, GNSS fix module 404, determining module 406 and blending module 408 may be combined as a unitary element. In other embodiments, at least one of Wi-Fi fix module 402, GNSS fix module 404, determining module 406 and blending module 408 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

Wi-Fi fix module 402 is operable to receive Wi-Fi positioning report from Wi-Fi PE 302 and to provide a Wi-Fi fix signal to determining module 406 and blending module 408 via a signal 410.

GNSS fix module 404 is operable to receive GNSS positioning report from modified GNSS PE 306 and to provide a GNSS fix signal to determining module 406 and blending module 408 via a signal 412.

Determining module 406 is operable to determine how much weightage is required for blending both GNSS and Wi-Fi fixes based on the combination of smart blending and constrained blending as discussed earlier. Determining module 406 is further operable to provide position feedback to modified GNSS PE 306 for changing the position states in its Kalman filter, based on the Wi-Fi fix and GNSS fix.

Blending module 408 is operable to receive weightage information for blending from determining module 406 via a signal 414. It further receives Wi-Fi fix signal 410 from Wi-Fi fix module 402 and GNSS fix signal 412 from GNSS fix module 404. Blending module 408 is further operable to compute a blending solution with Wi-Fi and GNSS fixes, in accordance with an aspect of the invention, and to provide GNSS and Wi-Fi blended solution via signal 316.

Figure 5:
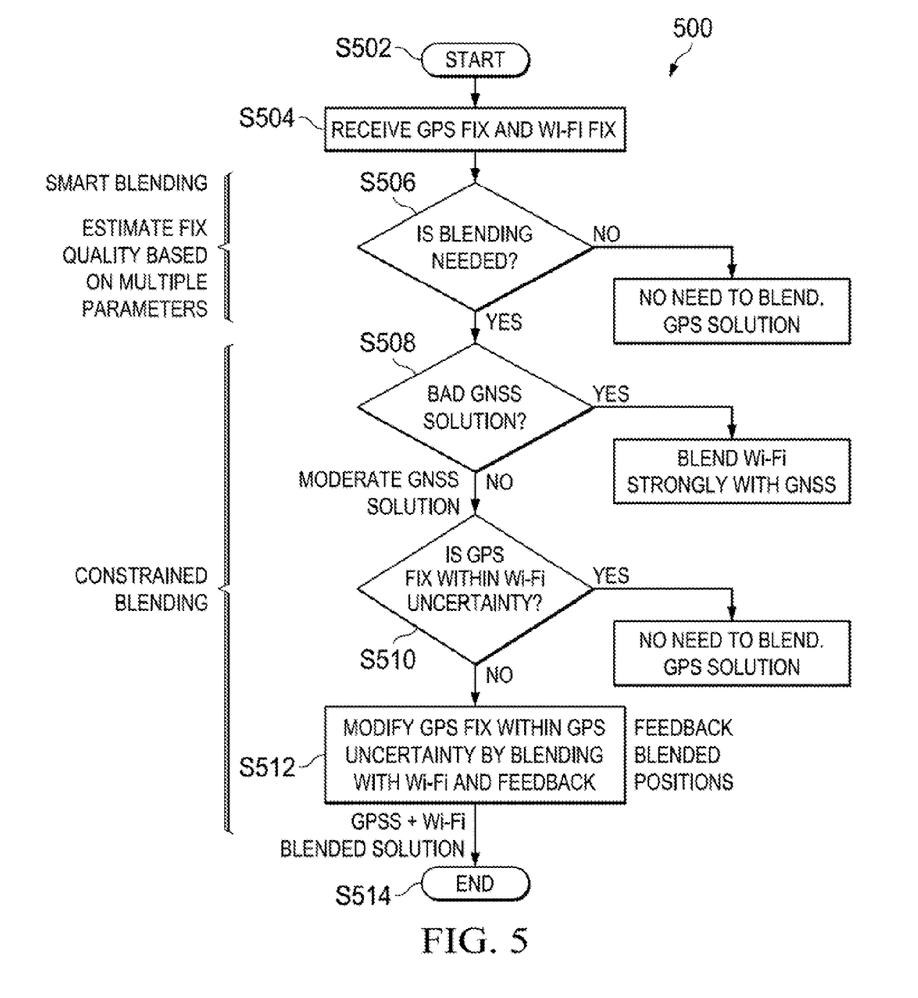
FIG. 5 illustrates a blending algorithm, in accordance with an aspect of the invention.

The blending algorithm using smart blending and constrained blending, in accordance with aspects of the invention is further discussed with the help of FIG. 5.

FIG. 5 illustrates a flow chart 500 for Wi-Fi and GNSS blending, in accordance with an aspect of the invention.

As illustrated, the algorithm starts when there is a need for blending (S502).

GNSS fix and Wi-Fi fix are received by hybrid PE 304, as provided by modified GNSS PE 306 and Wi-Fi PE 302 respectively (S504). For example, returning to FIGS. 2 and 3, at a first time, modified GNSS PE 306 may be provided with uncertainty circle 314 of GNSS output 208 and Wi-Fi PE 302 may be provided with uncertainty circle 226 and Wi-Fi fix 220. At a second subsequent time, modified GNSS PE 306 may be provided with uncertainty circle 216 of GNSS output 210 and Wi-Fi PE 302 may be provided with uncertainty circle 228 and Wi-Fi fix 222. At a third subsequent time, modified GNSS PE 306 may be provided with uncertainty circle 218 of GNSS output 212 and Wi-Fi PE 302 may be provided with uncertainty circle 230 and Wi-Fi fix 224.

Hybrid PE 304 performs smart blending to determine whether blending is needed (S506). In an example embodiment, the determination is based on estimating Wi-Fi and GNSS fix quality, which are based on multiple parameters. As described earlier, these parameters may be compared with pre-determined thresholds to determine whether blending is needed. Some non-limiting examples of such parameters are GNSS uncertainty, number of Satellite Vehicles (SVs) used, multi-path indicator, number of Wi-Fi APs and Wi-Fi uncertainty. If blending is not needed then the GPS solution is provided based on the GNSS fix.

Further, some embodiments that provide blending may be used to reduce power consumption associated with Wi-Fi scan module 106. Wi-Fi scan time is a system overhead with an associated power cost. For example, an average current consumption for a Wi-Fi scan is approximately 7 mA for 100 ms of scanning for every 1 second. If blending is not used, and the GPS solution is established based solely on the GNSS fix, then the current consumption for a Wi-Fi scan is saved. Returning to FIG. 3, this may be accomplished via signal 318, which instructs Wi-Fi PE 302 to instruct Wi-Fi scan module 106 to modify its Wi-Fi scanning for geodetic location purposes.

As mentioned previously, in some embodiments, Wi-Fi PE 302 may instruct Wi-Fi scan module 106, e.g., via signal 114, to modify its Wi-Fi scanning for geodetic location determining purposes. In some embodiments, the modification may take the form of disabling the Wi-Fi scanning. If a Wi-Fi scan is disabled for purposes of determining a geodetic location, then Wi-Fi scan module 106 may be available for data transfer, i.e., Wi-Fi communication. Accordingly, Wi-Fi PE 302 is able to modify the operation of Wi-Fi scan module 106 based on the GNSS signal, e.g., when the GNSS fix is sufficient.

Still further, embodiments of the present invention utilize an adaptive scan optimization for Wi-Fi scan module 106. Non-limiting example parameters of adaptive scan optimization include adaptively changing the scan rate of Wi-Fi scan module 106 and adaptively changing the channel of Wi-Fi scan module 106.

With respect to adaptively changing the scan rate of Wi-Fi scan module 106, the scan rate may be chosen based on context. For example, under open sky conditions, Wi-Fi scan module 106 may cease Wi-Fi scanning for purposes of determining a geodetic location. An open sky condition may be predetermined, such as for example returning to FIG. 2, if uncertainty circle 214 is below a predetermined threshold, e.g., four meters. In another example, Wi-Fi scan module 106 may lower its scan rate under low dynamics. For example, there may be situations in urban canyons that the scan rate Wi-Fi scan module 106 may be lowered because there are so many Wi-Fi APs.

With respect to adaptively changing the channel of Wi-Fi scan module 106, the channel selection may be determined based on likely AP availability. For example, of eleven Wi-Fi channels, the likely AP availability may be highest on only three channels. As such, as opposed to scanning all eleven channels, Wi-Fi scan module 106 may be instructed to only scan the three channels having the highest likely AP availability.

Returning to FIG. 4, if blending is needed, then determining module 406 determines the quality of GNSS fix such that blending module 408 can perform constrained blending accordingly. If the GNSS solution is bad, for example returning to FIG. 2 in the case of the first time, wherein modified GNSS PE 306 is provided with uncertainty circle 314 of GNSS output 208 and Wi-Fi PE 302 is provided with uncertainty circle 226 and Wi-Fi fix 220, blending module 408 blends Wi-Fi solution strongly with GNSS solution (S508). This may occur, for example, if the number of SVs is very low and the GNSS solution is drifting away quickly. In any event, hybrid PE 304 feeds back blended positions to modified GNSS PE 306 in order to replace the position states of Kalman filter inside modified GNSS PE 306. This feedback of blended positions enables early correction of GPS drifts.

If the GNSS solution is moderate, determining module determines whether the GPS fix is within the Wi-Fi uncertainty (S510). If the GPS fix is within the Wi-Fi uncertainty then the GPS fix is not blended with Wi-Fi in order to prevent same Wi-Fi information from affecting blended solution too much. GPS solution is provided by hybrid PE 304 via signal 316.

If the GPS fix is not within the Wi-Fi uncertainty, blending module 408 modifies the GPS fix by blending with Wi-Fi fix, while hybrid PE 304 keeps the feedback loop stable such that the blended fix stays within UPS uncertainty (S512).

GPS and Wi-Fi blended solution, is provided by hybrid PE 304 (S514) via signal 316 that provides an overall better positioning accuracy.

Figure 6:
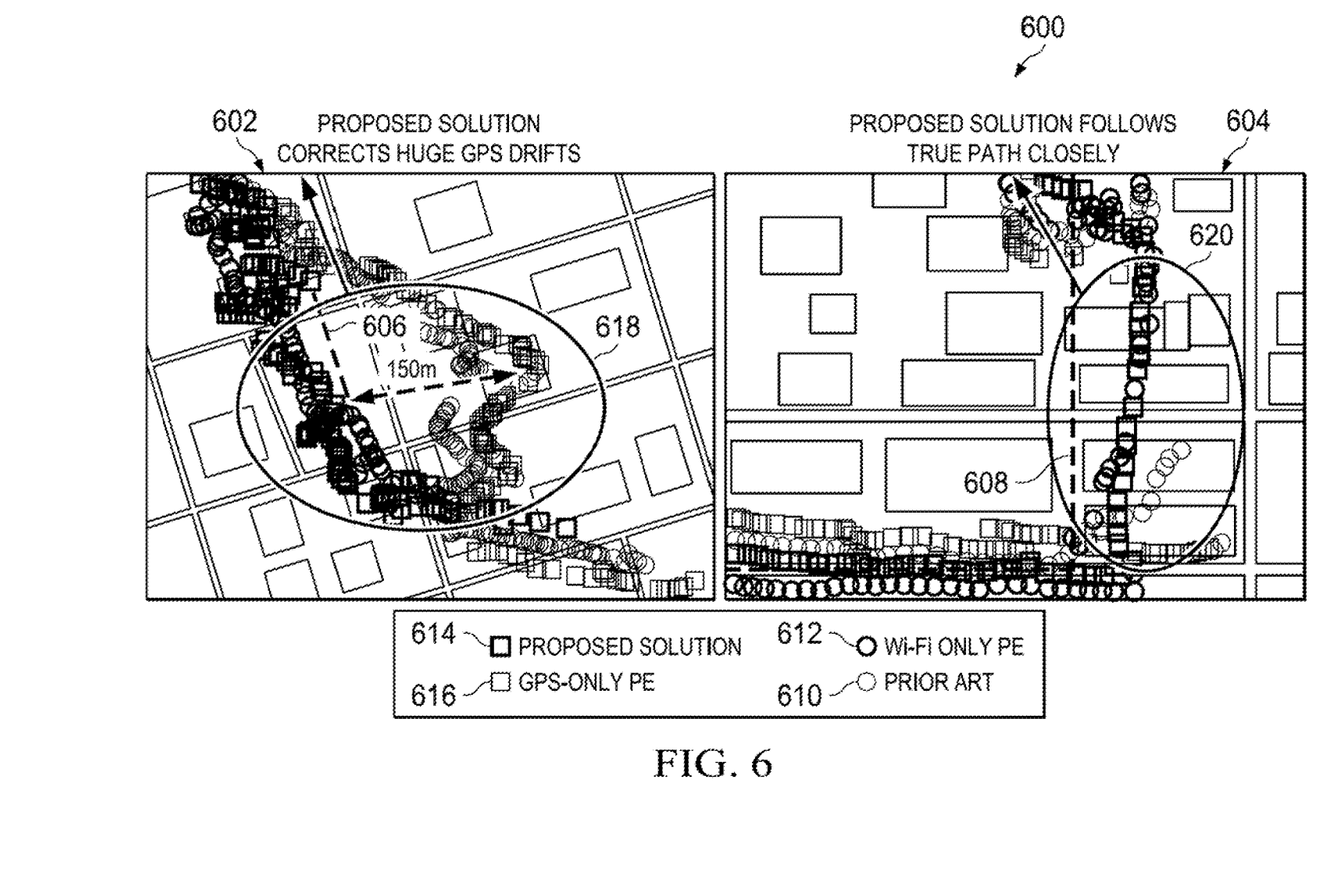
FIG. 6 illustrates performance of different positioning systems following a user's path in an urban canyon.

Performance of the proposed method, in accordance with an aspect of the invention, is discussed with the help of FIG. 6.

FIG. 6 illustrates different scenarios of a user's path in an urban canyon.

A scenario 602 illustrates a user walking on a path as indicated by a line 606. A scenario 604 illustrates a user driving on a path as indicated by a line 608.

A yellow circle 610 represents the prior art based on a feed forward solution. A blue circle 612 represents positioning with Wi-Fi only PE. A red square 616 represents positioning with GPS only PE. A green square 614 represents positioning with feedback blending, in accordance with an aspect of the invention.

As illustrated in scenario 602, GPS and feed forward blending follow similar path. Although Wi-Fi positioning is good and GPS positioning is bad, prior art cannot determine that quickly enough and follows the CPS only. At one point, GPS alone is 150 meters away from the true path, as shown by a circled area 618.

In the beginning, when GPS solution is not as good, Wi-Fi fix helps to pull the solution closer to the true path, as shown by green squares 614.

As illustrated in scenario 604, GPS solution comes to a halt at some point. When the user makes a left turn, GPS is not able to determine its location and cannot recover quickly. Prior art is also indeterministic and cannot recover quickly. However, the proposed solution follows true path closely as indicated by a circled area 620.

As discussed with reference to FIG. 6, proposed solution follows the true path closely in both the scenarios as compared to the feed forward solution.

Figure 7:
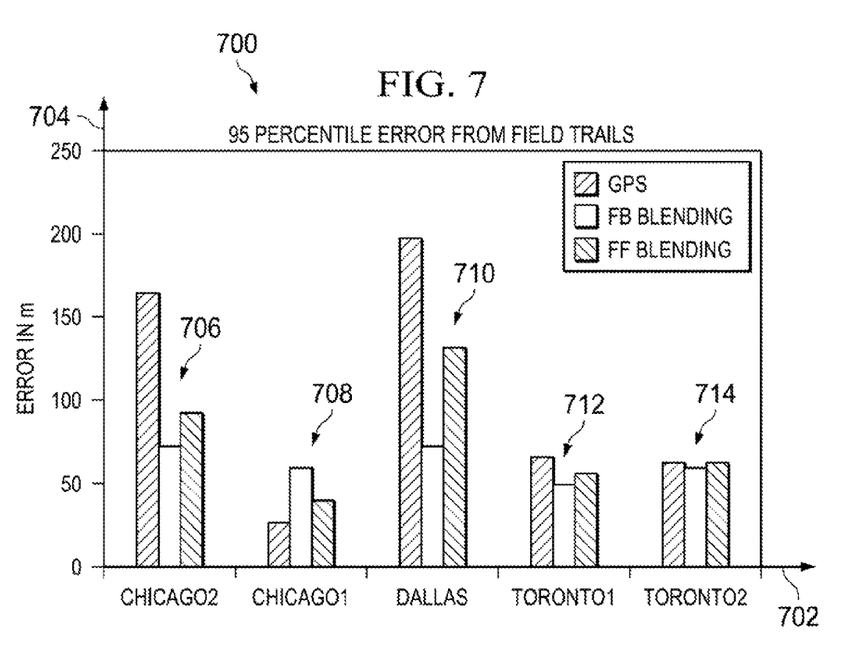
FIG. 7 illustrates a graph for performance statistics of the proposed method.

FIG. 7 illustrates a graph 700 for performance statistics of the proposed method.

As illustrated in the figure, an x-axis 702 represents the city where the field trial was conducted, and a y-axis 704 represents 95 percentile error in meters. Graph 700 includes a log 706, a log 708, a log 710, a log 712 and a log 714. Each log in graph 700 includes statistics from GPS solution, feedback (FB) blending solution and feed forward (FF) blending solution.

Log 706 for Chicago2 shows GPS error to be around 170 meters, FB blending error to be around 70 meters and FF blending error to be around 90 meters. Similarly, log 710 for Dallas shows GPS error to be around 200 meters. FB blending error to be around 70 meters and FF blending error to be around 130 meters. The performance statistics indicates that the FB blending reduces 95 percentile error by about 15-20% on average by preventing large outliars.

As discussed with reference to FIGS. 2-7, aspects of the invention provide an overall good positioning accuracy using blended Wi-Fi and GNSS solution as compared to the feed forward blending solution. Feeding back Wi-Fi and GNSS blended solutions to replace position states in GNSS enables blended solution to improve using past Wi-Fi information and also enables early correction of GPS drifts in urban canyons. Smart blending prevents early degradation of blended solution due to bad Wi-Fi information. Additionally, it gives good performance in open sky and mild urban canyons where GPS performance is generally quite good. Constrained blending enables good blending even with dependent or clustered Wi-Fi positions. It also keeps feedback loop stable by limiting changes to blended solution.

The foregoing description, of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
   a wireless local area network position processing engine operable to generate a first position signal based on a local area network product position signal from a wireless local area network product;
   a satellite positioning system position processing engine operable to generate a second position signal based on a satellite positioning system position signal from a satellite positioning system; and
   a hybrid processing engine operable to determine whether to generate a third position signal based on the first position signal, to generate the third position signal based on the second position signal or to generate the third position signal based on the first position signal and the second position signal, operable to generate the third position signal based on one of the group consisting of the first position signal, the second position signal and the combination of the first position signal and the second position signal.

2. The device of claim 1, wherein said hybrid processing engine is operable to determine to generate the third position signal based on the second position signal when a fix quality of the second position signal is equal to or greater than a predetermined threshold.

3. The device of claim 1, wherein said hybrid processing engine is operable to determine to generate the third position signal based on the first position signal and the second position signal when the fix quality of the second position signal is below a predetermined threshold.

4. The device of claim 1, wherein said hybrid processing engine is further operable to output a position feedback signal.

5. The device of claim 4, wherein said a satellite positioning system position processing engine is further operable to generate a subsequent position signal based on a subsequent satellite positioning system position signal and the position feedback signal.

6. The device of claim 5, wherein said hybrid processing engine is further operable to output the position feedback signal based on the first position signal.

7. The device of claim 6, wherein said hybrid processing engine is further operable to output the position feedback signal additionally based on the second position signal.

8. The device of claim 5, wherein said hybrid processing engine is further operable to output the position feedback signal based on the second position signa.

9. The device of claim 1,
   wherein said hybrid processing engine comprises a first fix module, a second fix module, a blending module and a determining module,
   wherein said first module is operable to generate a first fix signal,
   wherein said second fix module is operable to generate a second fix signal, and
   wherein said blending module is operable to provide a first weighting factor to the first fix signal and to provide a second weighting factor to the second fix signal.

10. The device of claim 9,
    wherein said first fix module is operable to generate the first fix signal as a Wi-Fi signal, and
    wherein said second fix module is operable to generate the second fix signal as a GNSS signal.

11. The device of claim 1, wherein said wireless local area network position processing engine is further operable to modify the operation of the wireless local area network product based on the GNSS signal.

12. A method comprising:
    generating, via a wireless local area network position processing engine, a first position signal based on a local area network product position signal from a wireless local area network product;
    generating, via a satellite positioning system position processing engine, a second position signal based on a satellite positioning system position signal from a satellite positioning system;
    determining, via a hybrid processing engine, whether to generate a third position signal based on the first position signal, to generate the third position signal based on the second position signal or to generate the third position signal based on the first position signal and the second position signal; and
    generating, via the hybrid processing engine, the third position signal based on one of the group consisting of the first position signal, the second position signal and the combination of the first position signal and the second position signal.

13. The method of claim 12, wherein said determining, via a hybrid processing engine, whether to generate a third position signal based on the first position signal, to generate the third position signal based on the second position signal or to generate the third position signal based on the first position signal and the second position signal comprises determining whether to generate the third position signal based on the second position signal when a fix quality of the second position signal is equal to or greater than a predetermined threshold.

14. The method of claim 12, wherein said determining, via a hybrid processing engine, whether to generate a third position signal based on the first position signal, to generate the third position signal based on the second position signal or to generate the third position signal based on the first position signal and the second position signal comprises determining whether to generate the third position signal based on the first position signal and the second position signal when the fix quality of the second position signal is below a predetermined threshold.

15. The method of claim 12, further comprising outputting, via the hybrid processing engine, a position feedback signal.

16. The method of claim 15, further comprising generating, via the satellite positioning system position processing engine, a subsequent position signal based on a subsequent satellite positioning system position signal and the position feedback signal.

17. The method of claim 16, further comprising outputting, via the hybrid processing engine, the position feedback signal based on the first position signal.

18. The method of claim 17, wherein said outputting, via the hybrid processing engine, the position feedback signal based on the first position signal comprises outputting the position feedback signal additionally based on the second position signal.

19. The method of claim 16, further comprising outputting, via the hybrid processing engine, the position feedback signal based on the second position signal.

20. The method of claim 12, further comprising:
wherein said hybrid processing engine comprises a first fix module, a second fix module, a blending module and a determining module,
generating, via a first module within the hybrid processing engine, a first fix signal;
generating, via a second fix module within the hybrid processing engine, a second fix signal;
providing, via a blending module within the hybrid processing engine, a first weighting factor to the first fix signal; and
providing, via the lending module, second weighting factor to the second fix signal.

21. The method of claim 20,
wherein said generating, via a first module within the hybrid processing engine, a first fix signal comprises generating the first fix signal as a Wi-Fi signal, and
wherein said generating, via a second fix module within the hybrid processing engine, a second fix signal comprises generating the second fix signal as a GNSS signal.

22. The method of claim 12, wherein further comprising modifying, via the wireless local area network position processing engine, the operation of the wireless local area network product based on the GNSS signal.

* * * * *